United States Patent
Ducate, Jr. et al.

(10) Patent No.: US 8,607,777 B2
(45) Date of Patent: Dec. 17, 2013

(54) FOLDING WORKTABLE FOR USE ON AN OUTDOOR GRILL

(75) Inventors: John Ducate, Jr., Columbia, SC (US); Sond-Kae Ho, Taichung County (TW)

(73) Assignee: The Grill Company, LLC, Columbia, SC (US)

( * ) Notice: Subject to any disclaimer, the term of this patent is extended or adjusted under 35 U.S.C. 154(b) by 166 days.

(21) Appl. No.: 13/293,226

(22) Filed: Nov. 10, 2011

(65) Prior Publication Data

US 2013/0118472 A1    May 16, 2013

(51) Int. Cl.
*F24B 3/00* (2006.01)

(52) U.S. Cl.
USPC .............. 126/30; 126/1 R; 126/25 R; 126/29; 126/334

(58) Field of Classification Search
USPC ... 126/25 R, 1 R, 29, 30, 334, 37 B, 9 R, 9 B; 108/42, 134, 131, 117, 48, 160, 152, 108/47, 104, 162, 46, 129, 130, 50.11, 108/50.13; 248/240, 240.4, 127, 371; 16/319, 345, 350, 343, 221, 374
See application file for complete search history.

(56) References Cited

U.S. PATENT DOCUMENTS

| | | | | |
|---|---|---|---|---|
| 2,483,899 A * | 10/1949 | Grasso et al. | ................. | 108/134 |
| 3,256,037 A * | 6/1966 | Giambalvo | ................ | 297/158.4 |
| 4,068,601 A * | 1/1978 | Marsh et al. | .................. | 108/134 |
| 7,634,969 B2 * | 12/2009 | Neunzert et al. | ............. | 108/132 |
| 8,267,017 B1 * | 9/2012 | Michael et al. | ................ | 108/42 |
| 2009/0165771 A1 * | 7/2009 | Selk | ............................ | 126/25 R |

* cited by examiner

*Primary Examiner* — Kenneth Rinehart
*Assistant Examiner* — Jorge Pereiro
(74) *Attorney, Agent, or Firm* — McNair Law Firm; Hunter Freeman

(57) ABSTRACT

The present invention relates to outdoor grill accessories, and more particularly, a foldable worktable attachment for an outdoor grill that includes a large table that is pivotally connected to the side of the grill. When in an erect position, the table provides ample space for preparing foods and the like, but when in a collapsed position, the table lies flush against one of the sides of the grill housing, thus, enclosing supporting legs that are folded and stored between the table and the grill housing.

18 Claims, 4 Drawing Sheets

FOLDING WORKTABLE FOR USE ON AN OUTDOOR GRILL

BACKGROUND OF THE INVENTION

1) Field of the Invention

The present invention relates to outdoor grill accessories, and more particularly, a foldable worktable attachment for an outdoor grill that provides a large work space for preparing foods and the like when in an erect position, but that may also be collapsed into a very compact position so that it lies flush against one of the sides of the grill housing.

2) Description of Related Art

One of the major limitations of an outdoor grill is the lack of work surface that is provided on the grill for purposes of preparing or simply storing foods that are to be, or have already been, cooked on the grill. Conventional grills typically provide two small shelves, one located on each side of the cooking surface of the grill. In some instances, one of the shelves is actually a side burner that can only be used as shelf space when not in use. When the side burner is in use, however, the grill only provides one shelf.

As anyone who has used an outdoor grill knows, it is advantageous to be able to store foods that are waiting to be grilled or that have been grilled on an easily reached shelf space. It would further be advantageous to have sufficient work space to be able to prepare the food that is to be cooked on the grill, thus minimizing the number of trips between the kitchen and the outdoor grill. However, grill manufacturers know that the size of the grill is of concern to consumers in that consumers have space limitations and cannot always accommodate a grill that is more than about 4-6 feet long. Accordingly, most outdoor grills utilize one or more small shelves. There has been a long felt need for a grill having an ample grilling surface as well as an ample work space for food preparation while keeping the grill within an acceptable and custom length for ordinary outdoor grills.

Accordingly, it is an object of the present invention to provide a grill having a worktable that provides an ample surface on which to store or prepare foods to be grilled, while keeping the dimensions of the grill within consumers' expectations and preferences.

Accordingly, it is another object of the present invention to provide a grill having a worktable that may be folded into a compact position along the side of the grill when the table is not in use so as to minimize the size of the grill when not in use.

Accordingly, it is another object of the present invention to provide an aftermarket accessory that may be attached to an outdoor grill to provide a foldable worktable with sufficient room to prepare and store foods to be grilled.

SUMMARY OF THE INVENTION

The above objectives are accomplished according to the present invention by providing a grill having a grill frame that defines a side of the grill; a worktable having a proximal end and a distal end, wherein the proximal end is pivotally carried by the side of the grill frame;

The above objectives are also achieved by providing a worktable having an upper surface, a lower surface, a proximal end and a distal end; a first connection member carried generally at the proximal end of the worktable for pivotally connecting the worktable to a grill frame; a lower shelf disposed beneath the work table and having an upper surface, a lower surface, a proximal end and a distal end; a second connection member carried generally at the proximal end of the lower shelf for pivotally connecting the lower shelf to the grill frame; a support leg interconnecting the worktable and the lower shelf, wherein the support leg is defined by an upper support leg and a lower support leg and wherein the upper support leg is pivotally carried by the lower surface of the worktable and is hingedly connected to the lower support leg and the lower portion is pivotally carried by the lower shelf; whereby the worktable has an erect position wherein the support leg is in a generally perpendicular position with respect to the worktable and the lower shelf and the worktable has a collapsed position wherein the lower surface of the worktable is placed generally adjacent and parallel to the lower surface of the lower shelf and wherein the upper support leg and the lower support leg are placed into a generally parallel position with respect to the worktable and the lower shelf.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom.

DETAILED DESCRIPTION OF A PREFERRED EMBODIMENT

With reference to the drawings, the invention will now be described in more detail.

Figure 1:
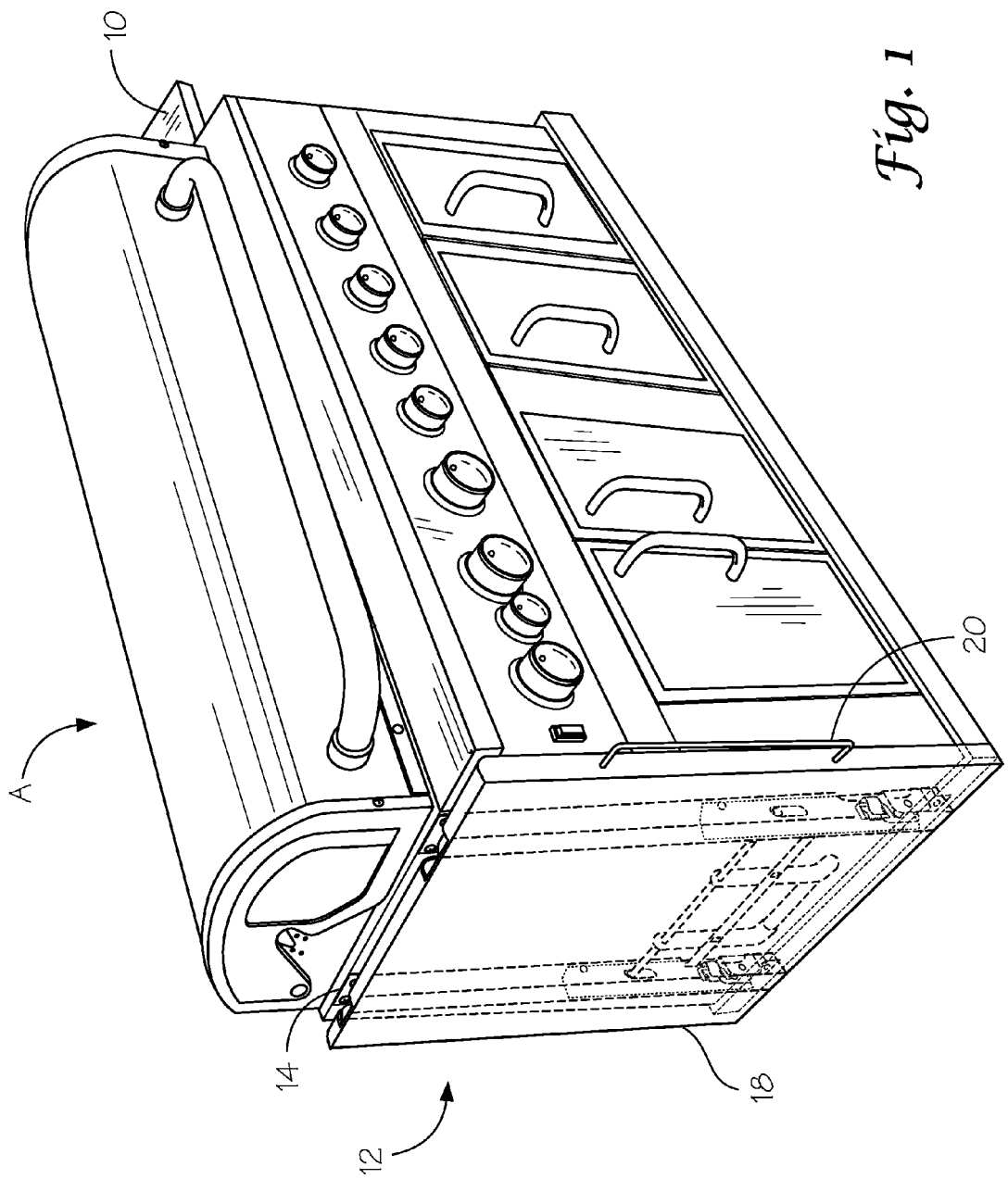
FIG. 1 shows a perspective view of the present invention where the foldable worktable is in a collapsed position.

Referring now to FIG. 1, an outdoor grill is generally shown as A. As can be seen, the grill includes a side burner 10 that may serve as a small shelf when not in use. On the opposite side, the grill includes a foldable worktable attachment generally shown as 12 that is hingedly connected to the grill housing by hinges 14. As can be seen, when in a collapsed position, the attachment folds up compactly against the side of the grill such that the upper surface of the table 18 acts as the side of the grill housing. The side of the table 18 is provided with a handle 20 to assist with placing the table attachment 12 in an erect or collapsed position. While the shown embodiment includes hinges as a connection member for pivotally connecting the worktable attachment to the grill, any connection member that provides a pivotal connection that is generally known in the art could be used.

Figure 2:
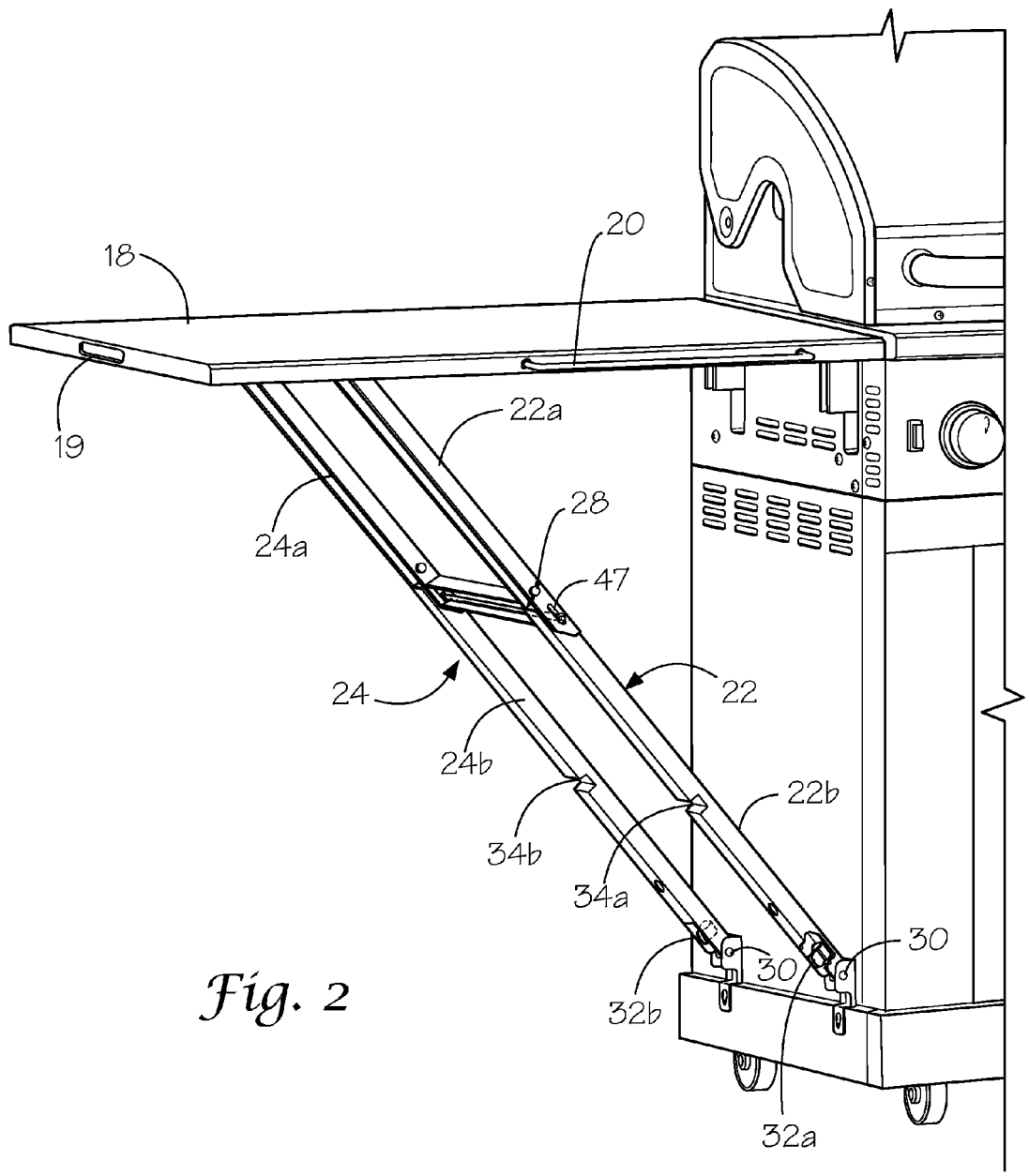
FIG. 2 shows a perspective view of the invention in an erect position.

Referring now to FIG. 2, the worktable attachment 12 can be seen in an erect position. The attachment includes a table 18 having a hand hold 19 disposed at the distal end of the table as well as a handle 20 disposed along its side to aid in transitioning the table between an erect and collapsed position. The attachment also includes hinged support legs shown generally as 22 and 24. Each hinged support leg has an upper leg portion 22a and 24a, respectively, that is hingedly connected to a lower leg portion 22b and 24b, respectively. The upper leg portions 22a and 24a are pivotally connected to the table 18 at the hinge points (shown as 26 in FIG. 4). A cross bar 27 interconnects the upper leg portions 22a and 24a to ensure that the upper leg portions maintain the same angular relation to the table at all times.

The lower leg portions 22b and 24b are hingedly connected to upper leg portions 22a and 24a at pivotal connection member 28. Lower leg portions are pivotally connected to the grill at pivotal connection member 30. Lower leg portions include clips 32a and 32b that are disposed just above pivotal connection member 30. These clips are adapted to receive brackets (shown as 62 in FIG. 4) that are disposed on the lower surface of the table to ensure that the table 18 lies flush against the grill when placed in a collapsed position. Lower leg portions 22a and 22b further include a cross bar slot 34 that is adapted to receive a cross bar (shown as 27 in FIG. 3) when the attachment is placed in a collapsed position so that the table 18 may lie flush against the side of the grill.

Figure 3:
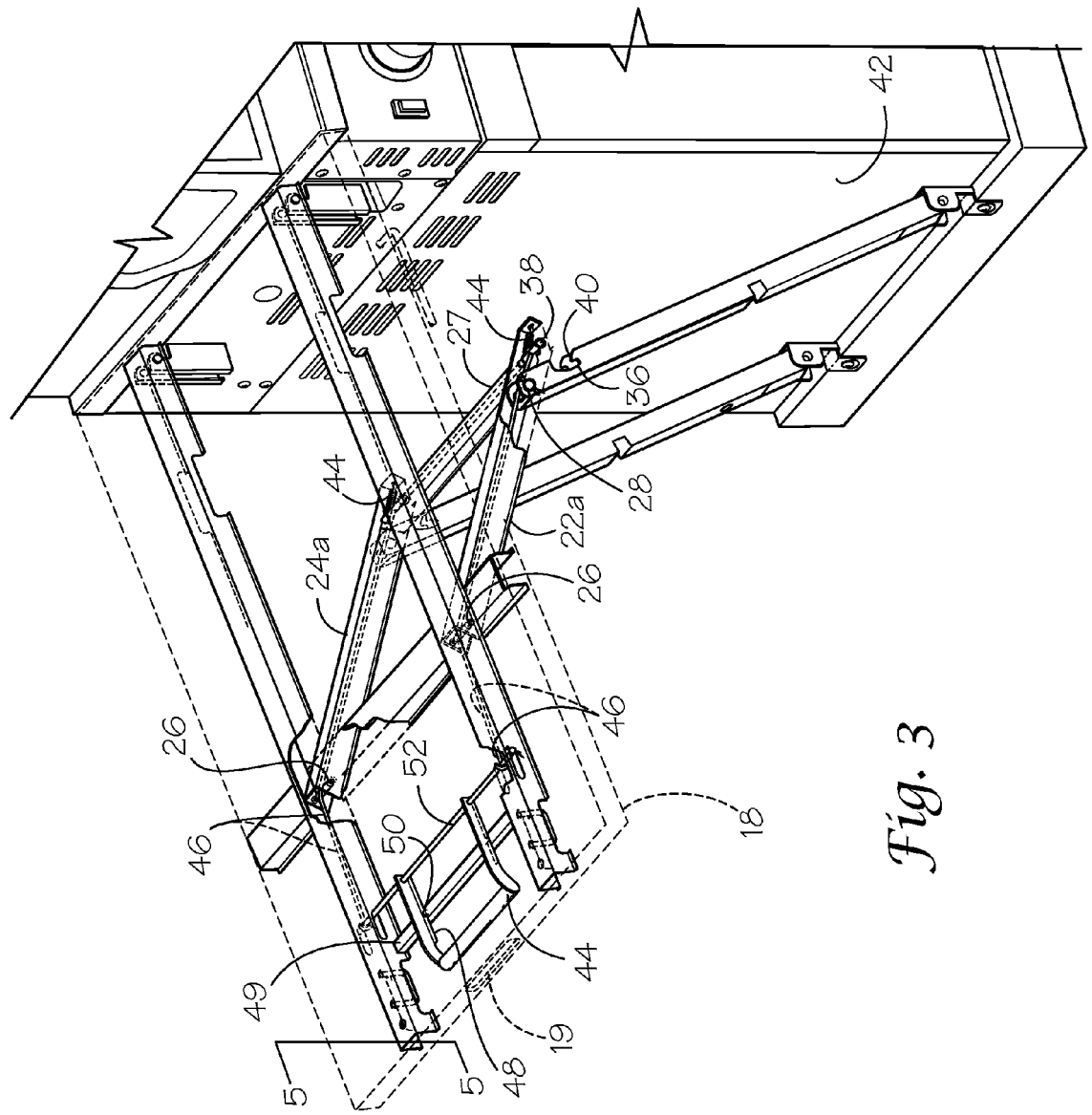
FIG. 3 shows a perspective view of the invention in a nearly erect position.

As can be seen in FIG. 3, each of the upper leg portions form a channel extending along the entire length of the upper leg portions that is adapted to receive lower leg portions. Unlike traditional hinged legs, where the hinge point is located at the respective ends of the legs, the pivotal connection 28 connecting the upper and lower leg portions is laterally spaced from the end of the upper leg portion. When the worktable attachment is in an erect position, the upper and lower leg portions overlap and the channel receives a small length of lower leg portions. When the attachment is in a collapsed position, the channel receives a greater portion of lower leg portions, thus allowing the table to lie flush against the side of the grill 42.

Lower leg portions include a securing pin slot 36 that disposed beneath pivotal connection point 28 and is adapted to receive a securing pin 38 that is slideably attached to each of the upper leg portions 22a and 24a. Securing pin slot 36 has a lip 40 that is adapted to guide the securing pin into the securing pin slot when the attachment is placed in the erect position shown in FIG. 2. Once in an erect position, securing pin slot 36 and securing pin 38 ensure that the upper and lower leg portions remain aligned where the upper and lower leg portions form a single leg that extends between the underside the table 18 and the side of the grill 42. As can be seen by the Figures, the manner in which the channel formed by the upper leg portion receives the lower leg portion is critical for allowing the securing pin to be received by the securing pin slot.

In the shown embodiment, securing pin 38 extends between upper leg portions 22a and 24a and through a channel that is formed by cross bar 27. In alternate embodiments, however, the invention could include two separate securing pins that are disposed in each of the upper leg portions. Securing pin 38 is connected to a release handle 44 by a connection member 46. The connection member can be wire, string, chain, twine or any other flexible line having sufficient strength and durability. The release handle is slideably carried generally at the distal end of the worktable 18 at a point that is generally adjacent to the hand hold 19 so that a user may reach the release handle by inserting their hand in the hand hold.

The release handle may be used to place the worktable attachment in a collapsed position. When the user pulls the release handle towards the distal end of the worktable, the securing pin 38 moves towards the hinge points 26 connecting the upper leg portions to the table 18. This allows the securing pin to be raised over the lip 40 and removed from the securing pin slot 36. Once the securing pin is removed from the securing pin slot, the upper and lower support leg portions may be rotated with respect to one another so that the channel formed by the upper leg portions 22a and 24a receive lower leg portions 22b and 24b. This allows the worktable 18 to be rotated downwardly toward the side of the grill and placed in the collapsed position shown in FIG. 1. In the shown embodiment, securing pin 38 is connected to the lower end of the upper leg portions 22a and 24a by a spring 44. This ensures that the securing pin is not accidentally removed from the securing pin slot when the table is in an erect position. In other embodiments, the securing pin may be biased by other techniques that are known in the industry. In further embodiments, the securing pin 38 does not need to be biased at all. As can be seen in FIG. 2, upper leg portions 22a and 24a are provided with a securing pin opening 47, in which the securing pin 38 is disposed so that the movement of the securing pin is restricted by the opening.

Figure 4:
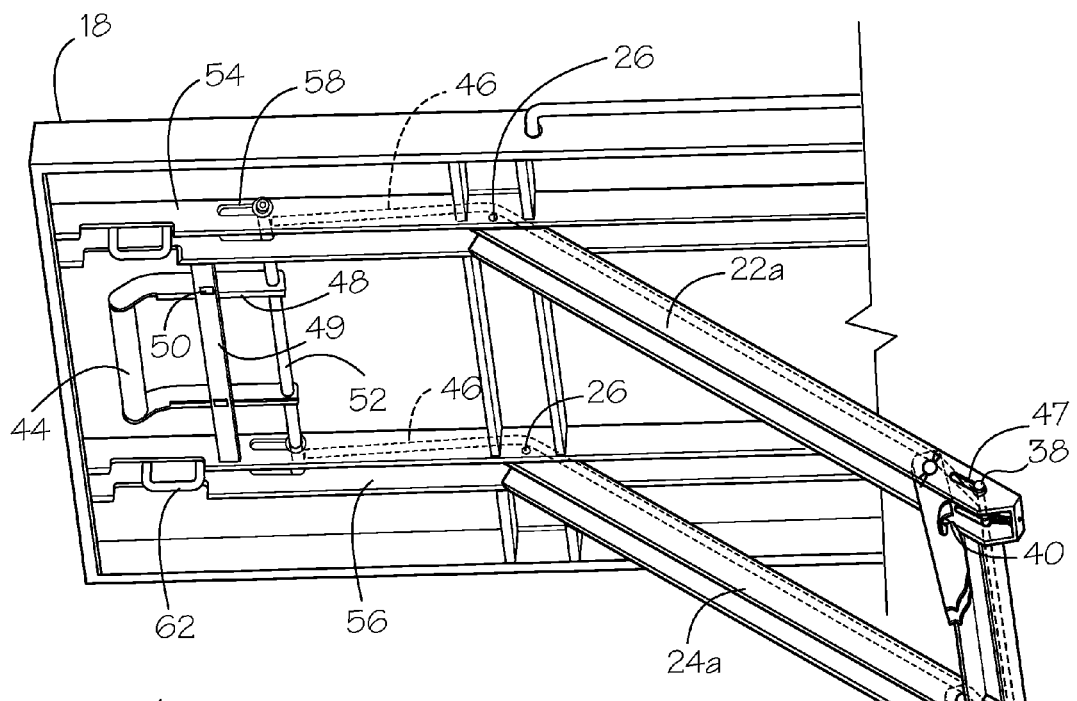
FIG. 4 shows a perspective view of the lower surface of the foldable worktable.

Referring now to FIGS. 3-4, the release handle may be more clearly seen. The release handle 44 is slideably carried by a release handle cross bar 49. The release handle cross bar extends between two support bars 54 and 56 that extend along the length of the underside of the table. These support bars define channels that are adapted to receive support legs 22 and 24 when the worktable is placed in a collapsed position. The release handle includes a flange 48 disposed along the bottom of the release handle that is adapted to be received by a tab 50 disposed on the release handle cross bar 49. The release handle also includes a rod 52 that extends through rod openings 58 and 60 defined in the support bars 54 and 56. The rod openings 58 and 60 correspond to the securing pin openings 47 defined in the upper leg portions and limit the movement of the rod in the same manner that the securing pin's movement is restricted by the securing pin opening.

The rod is connected to a connection member 46 that attaches the release handle to the securing pin 38. The connection member 46 extends through the channel defined by the support bars 54 and 56 until it reaches hinge point 26, at which point, the connection member enters the channel defined by the upper leg portions 22a and 24a and extends down the upper leg portion's channel to the securing pin 38. Accordingly, when the release handle 44 is pulled towards the distal end of the table, the securing pin 38 slides within the securing pin opening 47 so that the securing pin may be raised over the lip 40 and removed from the securing pin slot 36.

Figure 5:
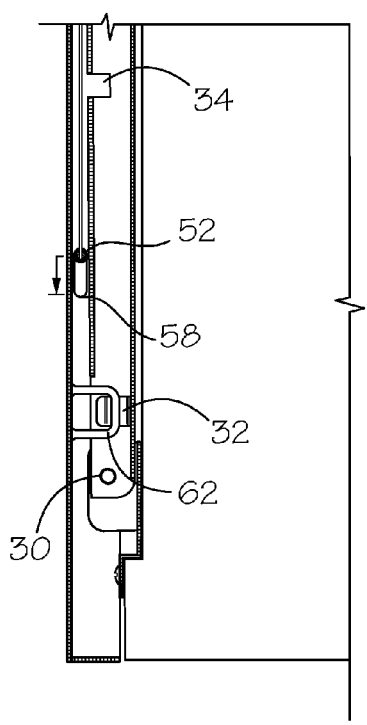
FIG. 5 shows a close-up cross section view the invention.

Referring now to FIG. 5, the securing clips 32 can be more clearly seen. Securing clips are disposed in lower leg portions at a point that is just above hinge point 30. These clips are adapted to receive brackets that are disposed on the underside of the table when the worktable is placed into a collapsed position. These clips 32 secure the table to the side of the grill until the user places the table in the erect position shown in FIG. 2.

While a preferred embodiment of the invention has been described using specific terms, such description is for illustrative purposes only, and it is to be understood that changes and variations may be made without departing from the spirit or scope of the following claims.

What is claimed is:

1. An outdoor grill comprising:
   a grill having a grill frame that defines a side of said grill;
   a worktable having a proximal end and a distal end, wherein said proximal end is pivotally carried by said side of said grill frame;
   an upper support leg having an upper end that is pivotally connected to said worktable and having a channel extending between said upper end and a lower end of said upper support leg;
   a lower support leg having an upper end that is pivotally connected to said upper support leg so that when said worktable is placed in an erect position said channel receives a portion of said lower support leg, wherein said lower support leg also has a lower end that is pivotally carried by said side of said grill frame;
   a securing pin slot that is disposed in said lower leg and has a lip adapted to engage a securing pin that is slideably carried by said upper support leg so that said lip guides said securing pin into said securing pin slot when said worktable is placed in said erect position, wherein said securing pin slot is adapted to receive said securing pin thereby securing said upper support leg and said lower support leg in an aligned position while said worktable is in said erect position;
   a release handle that is slideably disposed on said worktable and connected to said securing pin so that when said release handle is moved towards said distal end of said worktable, said securing pin is moved towards said upper end of said upper support leg thereby allowing said securing pin to be removed from said securing pin slot and said worktable to be placed in a collapsed position; and
   whereby said worktable is placed in said erect position when said distal end of said worktable is rotated away from said side of said grill and said securing pin is placed in said securing pin slot and said worktable is placed in said collapsed position when said release handle is moved towards said distal end of said worktable thereby causing said securing pin to be removed from said securing pin slot and said distal end of said worktable is rotated towards said side of said grill.

2. The outdoor grill of claim 1 further including a clip disposed generally adjacent to said lower end of said lower support leg that is adapted to receive a loop that is disposed generally adjacent said distal end of said worktable.

3. The outdoor grill of claim 1 wherein said securing pin is biased so that said when said worktable is placed in said erect position said securing pin remains in said securing pin slot until said release handle is moved towards said distal end of said worktable.

4. The outdoor grill of claim 1 further including a connection member connecting said release handle to said securing pin.

5. The outdoor grill of claim 4 wherein said securing pin and at least a portion of said connection member are disposed within said channel.

6. The outdoor grill of claim 1 further including a cross bar slot disposed on said lower support leg that is adapted to receive a cross bar that is carried by said worktable so that when said worktable is placed in said collapsed position, said cross bar slot receives said cross bar and said worktable lies flush against said side of said grill frame.

7. An outdoor grill comprising:
   a grill having a grill frame that defines a side of said grill;
   a worktable having a proximal end and a distal end, wherein said proximal end is pivotally carried by said side of said grill frame;
   an upper support leg having an upper end that is pivotally connected to said worktable and having a channel extending between said upper end and a lower end of said upper support leg;
   a lower support leg having an upper end that is pivotally connected to said upper leg so that when said worktable is placed in an erect position said channel receives a portion of said lower support leg, wherein said lower support leg also has a lower end that is pivotally carried by said side of said grill frame;
   a securing pin slot that is disposed in said lower leg and has a lip adapted to engage a securing pin that is slideably carried by said upper support leg so that said lip guides said securing pin into said securing pin slot when said worktable is placed in said erect position, and said lip retains said securing pin within said securing pin slot thereby securing said upper support leg and said lower support leg in an aligned position while said worktable is in said erect position;
   a release handle that is slideably disposed on said worktable and connected to said securing pin so that when said release handle is moved towards said distal end of said worktable, said securing pin is moved towards said upper end of said upper support leg, thereby allowing said securing pin to be removed from said securing pin slot and said worktable to be placed in a collapsed position; and
   whereby said worktable is placed in said erect position when said distal end of said worktable is rotated away from said side of said grill and said securing pin is placed in said securing pin slot and said worktable is placed in said collapsed position when said securing pin is raised over said lip and removed from said securing pin slot and said distal end of said worktable is rotated towards said side of said grill.

8. The outdoor grill of claim 7 wherein said securing pin is biased so that said when said worktable is placed in said erect position said securing pin remains in said securing pin slot until said release handle is moved towards said distal end of said worktable.

9. The outdoor grill of claim 7 further including a connection member connecting said release handle to said securing pin.

10. The outdoor grill of claim 9 wherein said securing pin and at least a portion of said connection member are disposed within said channel.

11. The outdoor grill of claim 7 further including a cross bar slot disposed on said lower support leg that is adapted to receive a cross bar that is carried by said worktable so that when said worktable is placed in said collapsed position, said cross bar slot receives said cross bar and said worktable lies flush against said side of said grill frame.

12. The outdoor grill of claim 7 further including a clip disposed generally adjacent to said lower end of said lower support leg that is adapted to receive a loop that is disposed generally adjacent said distal end of said worktable.

13. A collapsible worktable for use on an outdoor grill comprising:
- a worktable having a proximal end and a distal end;
- a first connection member carried generally at said proximal end of said worktable for pivotally connecting said worktable to a grill frame;
- a support leg defined by an upper support leg and a lower support leg, wherein said upper support leg is pivotally carried by said worktable and is pivotally connected to said lower support leg by a second connection member;
- a third connection member carried by said lower support leg for pivotally connecting said lower support leg to the grill frame;
- a securing pin slot that is disposed in said lower leg and has a lip adapted to engage a securing pin that is slideably carried by said upper support leg so that said lip guides said securing pin into said securing pin slot when said upper support leg and said lower support leg are placed in an aligned position, wherein said lip retains said securing pin within said securing pin slot thereby securing said upper support leg and said lower support leg in the aligned position;
- a cross bar slot that is disposed on said lower support leg at a point that laterally spaced from said securing pin slot, wherein said cross bar slot is adapted to receive a cross bar that is carried by said worktable so that when said worktable is placed in said collapsed position, said cross bar slot receives said cross bar allowing said worktable to lie flush against the side of a grill to which it is attached; and
- whereby said worktable has an erect position where said upper support leg and said lower support leg are aligned and said securing pin is placed in said securing pin slot and said worktable has a collapsed position where said securing pin is raised over said lip and removed from said securing pin slot and said upper support leg is in a generally parallel position to said worktable.

14. The worktable of claim 13 further including a release handle that is slideably carried by said worktable and connected to said securing pin so that when said release handle is moved towards said distal end of said worktable, said securing pin is raised over said lip, thereby allowing said securing pin to be removed from said securing pin slot and said worktable to be placed in said collapsed position.

15. The outdoor grill of claim 14 wherein said securing pin is biased so that when said worktable is in said erect position said securing pin remains in said securing pin slot until said release handle is moved towards said distal end of said worktable.

16. The outdoor grill of claim 15 further including a fourth connection member connecting said release handle to said securing pin.

17. The outdoor grill of claim 16 wherein said upper support leg includes a channel extending between a first and second end of said upper support leg and said securing pin and at least a portion of said fourth connection member are disposed within said channel.

18. The outdoor grill of claim 13 wherein said cross bar slot is disposed on said lower support leg and is adapted to receive a cross bar that is carried by said worktable so that when said worktable is placed in said collapsed position, said cross bar slot receives said cross bar allowing said worktable to lie flush against the side of a grill to which it is attached.

* * * * *